(12) United States Patent
Rossel

(10) Patent No.: US 11,044,913 B2
(45) Date of Patent: Jun. 29, 2021

(54) SILYLATED POLYALCOHOLS AND COMPOSITIONS THEREOF

(71) Applicant: Oystershell NV, Merelbeke (BE)

(72) Inventor: Bart Rossel, Nederzwalm (BE)

(73) Assignee: Oystershell NV, Merelbeke (BE)

( * ) Notice: Subject to any disclaimer, the term of this patent is extended or adjusted under 35 U.S.C. 154(b) by 0 days.

(21) Appl. No.: 16/488,486

(22) PCT Filed: Feb. 23, 2018

(86) PCT No.: PCT/EP2018/054596
§ 371 (c)(1),
(2) Date: Aug. 23, 2019

(87) PCT Pub. No.: WO2018/154084
PCT Pub. Date: Aug. 30, 2018

(65) Prior Publication Data
US 2019/0387742 A1 Dec. 26, 2019

(30) Foreign Application Priority Data

Feb. 24, 2017 (EP) ..................................... 17157894

(51) Int. Cl.
*A01N 55/00* (2006.01)
(52) U.S. Cl.
CPC .................................. *A01N 55/00* (2013.01)
(58) Field of Classification Search
CPC ..................................................... A01N 55/00
See application file for complete search history.

(56) References Cited

U.S. PATENT DOCUMENTS

| 3,465,020 A | 9/1969 | Frye | |
| 8,097,602 B1 * | 1/2012 | Holzer | ................... A01N 55/00 |
| | | | 514/560 |

FOREIGN PATENT DOCUMENTS

| GB | 2 026 511 A | 2/1980 |
| WO | WO 00/53507 A1 | 9/2000 |
| WO | WO 02/36065 A1 | 5/2002 |
| WO | WO 2011/158879 A1 | 12/2011 |

OTHER PUBLICATIONS

International Preliminary Report on Patent Ability received in PCT Application No. PCT/EP2018/054596, dated Apr. 30, 2019.
International Search Report and Written Opinion received in PCT Application No. PCT/EP2018/054596, dated Mar. 27, 2018.
Bilik et al.: "Determination of silicon in O-(trimethylsilyl) derivatives of saccharides [Stanovenie krem,ka v 0-(trimetylsilyl)derivatoch sacharidov]", Chemical Papers (Chemicke Zvesti), Jan. 1, 1964, pp. 688-691.
Breederveld et al., "The Preparation of Some 1, 2, 3-Tri (Trialkyl-Siloxy) Propanes," Recueil des Travaux Chimiques des Pays-Bas, Jan. 1, 1953, pp. 706-710.
Burgess Ian et al.: 11 Dimeticone 4% liquid gel found to kill all lice and eggs with a single 15 minute application, BMC Research Notes, BioMed Central Ltd, (vol. 4, No. 1) Jan. 25, 2011. p. 15.
Database WPI; Week 201205, Thomson Scientific, London, GB; AN 2011-Q72792; Dec. 22, 2011.
Henglein et al.: "Substituierte Silylderivate des Pektins and der Glucose", Die Makromolekulare Chemie, Jan. 1, 1956, pp. 59-73.
Sprung et al: "Trimethylsi Lyl Derivatives of Polyols", Journal of Organic Chemistry, Dec. 1, 1955, pp. 1750-1756.

* cited by examiner

*Primary Examiner* — Samira J Jean-Louis
(74) *Attorney, Agent, or Firm* — Knobbe Martens Olson & Bear LLP

(57) ABSTRACT

The present disclosure provides silylated polyalcohols, compositions thereof and their use as medical, insecticidal, prophylactic or therapeutic substances for the treatment or prevention of infection or infestation by arthropods. More specifically, the disclosure relates to the methods of treatment of infections or infestation by lice in a human comprising administration of an effective amount of silylated polyalcohols and compositions thereof.

23 Claims, 5 Drawing Sheets

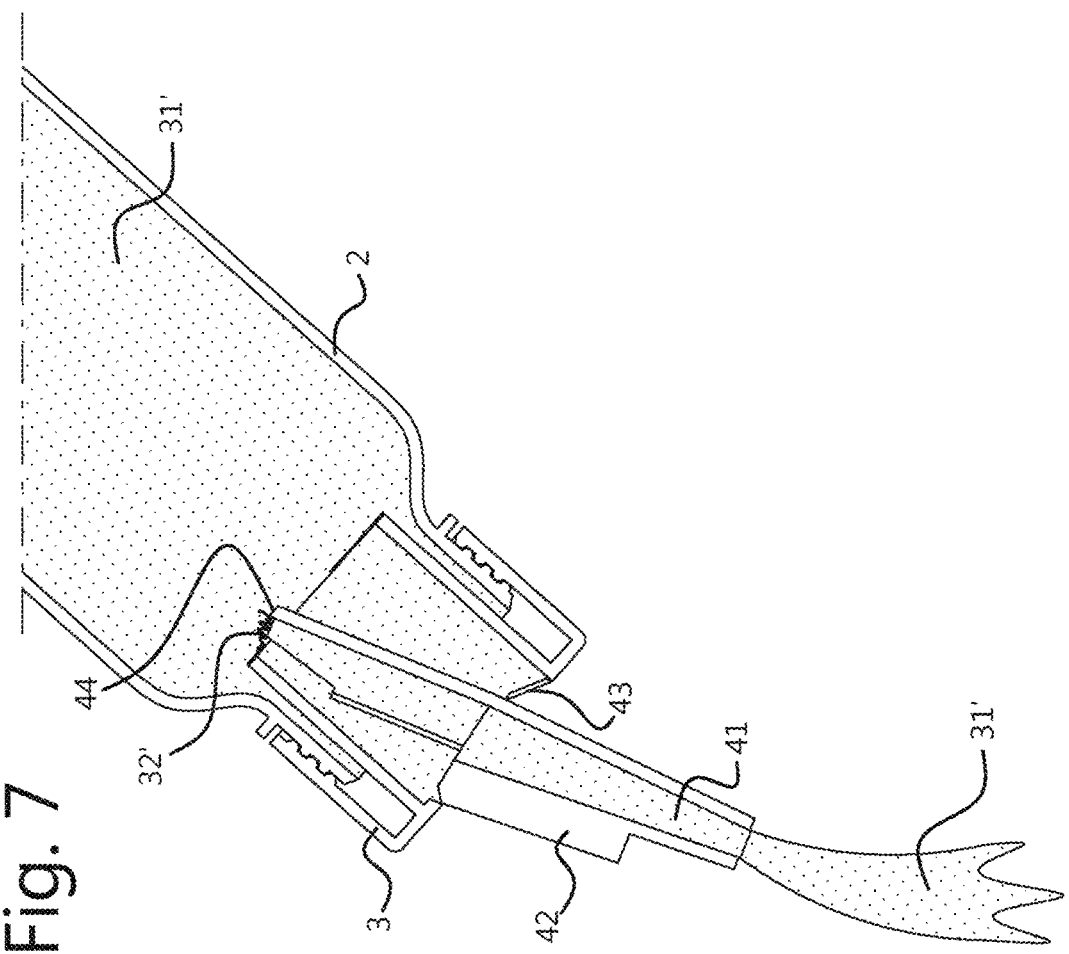
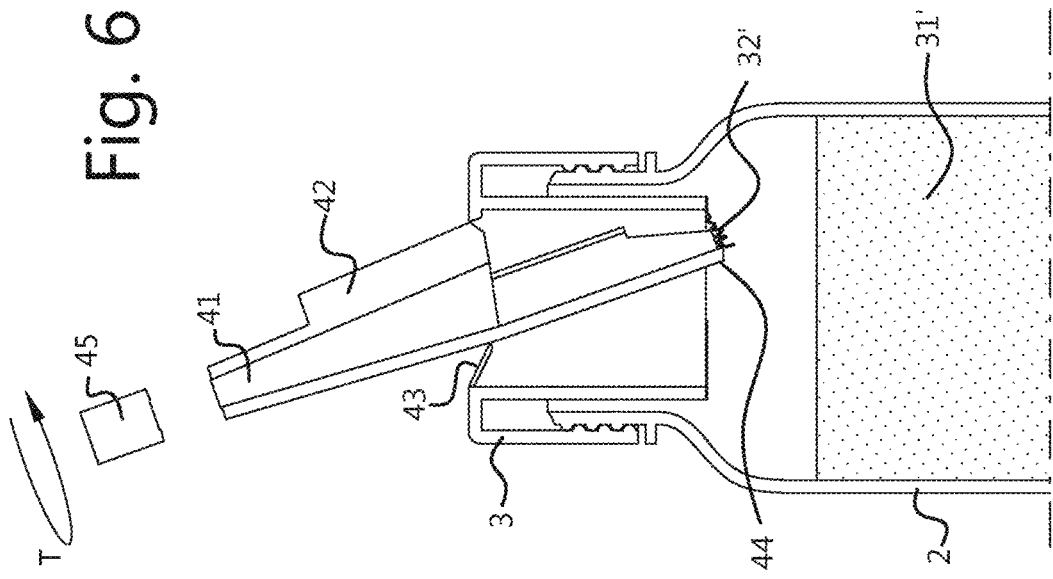

SILYLATED POLYALCOHOLS AND COMPOSITIONS THEREOF

CROSS-REFERENCED TO RELATED APPLICATIONS

This application is the U.S. National Phase under 35 U.S.C. § 371 of International Application No. PCT/EP2018/054596, filed Feb. 23, 2018, designating the U.S., and published in English as WO 2018/154084 A1 on Aug. 30, 2018, which claims priority to European Patent Application No. 17157894.1, filed Feb. 24, 2017, the entire contents of which are incorporated herein by reference.

TECHNICAL FIELD

The present invention relates to the field of silyl ether compounds, composition thereof and their use as medical, insecticidal or therapeutic substances. More specifically, the invention relates to the use of silyl ether compounds and compositions thereof for treatment of lice infections.

BACKGROUND

Silyl ether compounds are known as efficient agents for the treatment of head lice infections or in the control of arthropods. The most prominent member of this class of compounds is polydimethylsiloxane (PDMS) or dimethicone. Dimethicone is a polymeric organosilicon compound which is a safe, effective and physically acting alternative to insecticides for the treatment of head lice. In this respect, WO 2008/087148 describes foamable compositions for killing arthropods and their eggs, such as lice or ticks and nits, comprising as active ingredient more than 50% by weight of one or more saturated linear or branched hydrocarbons and as a stabilizing agent one or more linear or branched siloxanes. Further, the use of such compositions for killing arthropods and a method for killing arthropods comprising the application of the compositions is disclosed. In lice treatment, dimethicone and other siloxanes have the disadvantage of poor water solubility. Until now, any attempt to improve the water solubility or dispersion by creating a polar derivative of siloxane lead to loss of inherent therapeutic efficacy on lice and arthropods.

It is an object of the present invention to provide new, stable, highly active, water dispersible and readily accessible compounds and compositions with anti-arthropods activity, as well as their use for the treatment of lice, fleas, bugs, ticks, mites, etc. infestations in mammals and birds. It is especially an object of the invention to provide compounds and compositions which are easily removed from the treated human or animal, which lice, fleas, bugs, mites or ticks may otherwise recover from the treatment and proceed the infestation. It is also an object of the invention to provide easy-to-handle devices for preparing such compositions and for applying such composition to a subject or object.

SUMMARY

The current invention provides in a solution for at least one of the above mentioned problems by providing silylated polyalcohols, composition thereof and their use as medical, pesticidal and insecticidal substances (including other nuisance arthropods such as ticks) and more specifically for treatment of lice infections.

In a first aspect, the present invention provides a silylated polyalcohol, or a stereo-isomeric, a pharmaceutically acceptable salt, a solvate or a polymorph thereof. The inventors have surprisingly found that such compounds exhibit a high pediculicidal activity despite their high water dispersion properties.

In a second aspect, the present invention provides a silylated polyalcohol according to the first aspect of the invention for use as a medicament.

In a third aspect, the present invention provides a silylated polyalcohol according to the first aspect of the invention for use in treatment or prevention of infection or infestation by arthropods in a human or animal.

In a fourth aspect, the present invention provides a composition comprising a silylated polyalcohol according to the first aspect of the invention and a suitable carrier.

In a fifth aspect, the present invention provides a composition according to the fourth aspect of the invention for use as a medicament.

In a sixth aspect, the present invention provides a composition according to the fourth aspect of the invention for use in treatment or prevention of infection or infestation by arthropods in a human or animal.

In a seventh aspect, the present invention provides a method for preparing a composition according to the fourth aspect of the invention comprising the step of mixing one or more silylated polyalcohols according to the first aspect of the invention with a suitable carrier.

In an eight aspect, the present invention provides a multi-chamber dispensing device comprising at least a first chamber comprising a silylated polyalcohol according to the first aspect of the invention and a second chamber, said second chamber optionally comprising a cosmetically and/or pharmaceutically acceptable liquid medium, whereby said first chamber and said second chamber are separated by a seal, and whereby a fluid connection between said first chamber and said second chamber is formed upon breaking said seal.

DETAILED DESCRIPTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight and are abbreviated as "% wt.", unless otherwise defined or unless a different meaning is obvious to the person skilled in the art from its use and in the context wherein it is used.

A "disorder" in a subject is a state of health in which the subject is able to maintain homeostasis, but in which the subject's state of health is less favourable than it would be in the absence of the disorder. Left untreated, a disorder does not necessarily cause a further decrease in the subject's state of health. In the context of the present application, a parasite infestation, i.e. an ectoparasite infestation, is considered a disorder.

As used herein, a "subject" is a human or animal body. As used herein, a "subject in need thereof" is a patient, animal, or human, who will benefit from the treatment of this disclosure. As used herein, "animal" preferably refers to vertebrates, more preferably to birds and mammals, and even more preferably to mammals.

As used herein, an "ectoparasite infestation" is an infestation of the human or animal body by ectoparasites. Ectoparasites are organisms which inhabit the skin or outgrowths of the skin of another organism (the host) for various periods, and may be detrimental to the latter, i.e. by causing infestations in the host. Hosts are typically livestock, pets, laboratory animals as well as humans. In a preferred embodiment, the ectoparasite is selected of the group comprising leeches, lice such as sucking lice or chewing lice, bugs such as bat bugs or bed bugs, fleas, ticks and mites. In a more preferred embodiment, the ectoparasite is selected of the group comprising lice such as sucking lice or chewing lice, bed bugs, fleas, ticks and mites. In an even more preferred embodiment, the ectoparasite is selected of the group comprising lice such as sucking lice or chewing lice, fleas, ticks. Most preferably, the ectoparasite is lice such as sucking lice or chewing lice.

As used herein, an "arthropod" is an invertebrate animal having an exoskeleton (external skeleton), a segmented body, and paired jointed appendages. Arthropods form the phylum Euarthropoda, which includes insects, arachnids, myriapods, and crustaceans. In a preferred embodiment, the arthropod has an arthropod trachea system to introduce respiratory gases to its interior and perform gas exchange. The arthropod may have spiracles on the exoskeleton. In a preferred embodiment, the arthropod is selected of the group comprising lice such as sucking lice or chewing lice, bugs such as bat bugs or bed bugs, fleas, ticks and mites. In a more preferred embodiment, the arthropod is selected of the group comprising lice such as sucking lice or chewing lice, bed bugs, fleas, ticks and mites. In an even more preferred embodiment, the arthropod is selected of the group comprising lice such as sucking lice or chewing lice, fleas, ticks. Most preferably, the arthropod is lice such as sucking lice or chewing lice.

As used herein, an "effective amount" means an amount sufficient to produce a selected effect, such as alleviating symptoms of a disease or disorder. In the context of administering compounds in the form of a combination, such as multiple compounds, the amount of each compound, when administered in combination with another compound(s), may be different from when that compound is administered alone. Thus, an effective amount of a combination of compounds refers collectively to the combination as a whole, although the actual amounts of each compound may vary. The term "more effective" means that the selected effect is alleviated to a greater extent by one treatment relative to the second treatment to which it is being compared. Preferably, the silylated polyalcohol according to the invention is provided in an effective amount to the subject and/or object in need thereof.

The term "improve," as used herein, refers to the ability of a compound, agent, or method to improve a described symptom or condition based on the context in which the term "improve" is used. Preferably, improvement is by at least 10%, more preferably by at least 25%, even more preferably by at least 50%, and most preferably, the symptom or condition is improved by at least 75%.

As used herein, an "instructional material" includes a publication, a recording, a diagram, or any other medium of expression which can be used to communicate the usefulness of a compound of the disclosure in the kit for effecting alleviation of the various diseases or disorders recited herein. Optionally, or alternately, the instructional material may describe one or more methods of alleviating the diseases or disorders in a subject. The instructional material of the kit may, for example, be affixed to a container which contains the identified compound disclosure or be shipped together with a container which contains the identified compound. Alternatively, the instructional material may be shipped separately from the container with the intention that the instructional material and the compound be used cooperatively by the recipient.

The term "pharmaceutical composition" shall mean a composition comprising at least one active ingredient, whereby the composition is amenable to investigation for a specified, efficacious outcome in a mammal (for example, without limitation, a human). Those of ordinary skill in the art will understand and appreciate the techniques appropriate for determining whether an active ingredient has a desired efficacious outcome based upon the needs of the artisan.

As used herein, the term "pharmaceutically acceptable carrier" means a chemical composition with which silylated polyol can be combined and which, following the combination, can be used orally to administer the silylated polyol to a subject. Pharmaceutically acceptable carriers are known to the person skilled in the art.

As used herein, the term "cosmetically acceptable carrier" means a chemical composition with which an appropriate compound or derivative can be combined and which, following the combination, can be used topically to administer the silylated polyol to a subject. Cosmetically acceptable carriers are known to the person skilled in the art.

The term "prevent," as used herein, means to stop something from happening, or taking advance measures against something possible or probable from happening. In the context of medicine, "prevention" generally refers to action taken to decrease the chance of getting a disease or condition.

A "prophylactic" treatment is a treatment administered to a subject who does not exhibit signs of a disease or injury or exhibits only early signs of the disease or injury for the purpose of decreasing the risk of developing pathology associated with the disease or injury.

The term "reduce," as used herein, refers to the ability of a compound, agent, or method to reduce or impede a described infestation based on the context in which the term "reduce" is used. Preferably, reduction is by at least 10%, more preferably by at least 25%, even more preferably by at least 50%, and most preferably, the symptom or condition is reduced by at least 75%.

A "therapeutic" treatment is a treatment administered to a subject who exhibits signs of pathology for the purpose of diminishing or eliminating those signs.

A "therapeutically effective amount" of a compound is that amount of compound which is sufficient to provide a beneficial effect to the subject to which the compound is administered.

The term "topical application," as used herein, refers to administration to a surface, such as the skin. This term is used interchangeably with "cutaneous application" in the case of skin. A "topical application" is a "direct application".

The term "suitable carrier," as used herein, refers to a cosmetically acceptable liquid medium, and preferably to a pharmaceutically acceptable liquid medium as commonly used in gels, lotions, shampoos, liquid soaps, etc. The skilled person will readily distinguish a "cosmetically acceptable liquid medium" and "a pharmaceutically acceptable liquid medium" from "cosmetically non-acceptable liquid medium" and "a pharmaceutically non-acceptable liquid medium," respectively.

As used herein, the term "treating" may include prophylaxis of the specific injury, disease, disorder, or condition, or alleviation of the symptoms associated with a specific injury, disease, disorder, or condition and/or preventing or eliminating said symptoms. A "prophylactic" treatment is a treatment administered to a subject who does not exhibit signs of a disease or exhibits only early signs of the disease for the purpose of decreasing the risk of developing pathology associated with the disease. "Treating" is used interchangeably with "treatment" herein.

As used herein, "additional ingredients" include one or more of the following: excipients; surface active agents; dispersing agents; inert diluents; granulating and disintegrating agents; binding agents; lubricating agents; sweetening agents; flavouring agents; colouring agents; preservatives; physiologically degradable compositions such as gelatine; aqueous vehicles and solvents; oily vehicles and solvents; suspending agents; dispersing or wetting agents; emulsifying agents, demulcents; buffers; salts; thickening agents; fillers; emulsifying agents; antioxidants; antibiotics; antifungal agents; stabilizing agents; and pharmaceutically acceptable polymeric or hydrophobic materials. Other "additional ingredients" which may be included in the pharmaceutical compositions are known in the art and described, for example in Genaro, ed. (1985, Remington's Pharmaceutical Sciences, Mack Publishing Co., Easton, Pa.).

Other components such as preservatives, antioxidants, surfactants, absorption enhancers, viscosity enhancers or film forming polymers, bulking agents, diluents, colouring agents, flavouring agents, pH modifiers, sweeteners or taste-masking agents may also be incorporated into the composition. Suitable colouring agents include red, black, and yellow iron oxides and FD&C dyes such as FD&C Blue No. 2 and FD&C Red No. 40. Suitable flavouring agents include mint, raspberry, liquorice, orange, lemon, grapefruit, caramel, vanilla, cherry grape flavours and combinations thereof. Suitable pH modifiers include citric acid, tartaric acid, phosphoric acid, hydrochloric acid, maleic acid and sodium hydroxide. Suitable sweeteners include aspartame, acesulfame K and thaumatin. Suitable taste-masking agents include sodium bicarbonate, vanilla, ion-exchange resins, cyclodextrin inclusion compounds and adsorbates.

The current invention provides in a solution for at least one of the above mentioned problems by providing a silylated polyalcohols and compositions thereof.

1. Silylated Polyalcohol

In a first aspect, the present invention provides a silylated polyalcohol, or a stereo-isomeric, a pharmaceutically acceptable salt, a solvate or a polymorph thereof.

The inventors have surprisingly found that such compounds exhibit a high pediculicidal activity, thereby effectively exterminating arthropods. This is of special interest since such compounds are easily obtainable compared to i.e. silicone-based agents, as will be illustrated below. Without being bound to any mechanistic theories, it is rationalized that siloxanes and other apolar substances affect lice and other arthropods because these substances penetrate and cover the breathing organs of these animals (such as the spiracles, trachea, gills or primitive lungs) and interfere with respiration and gas/moisture exchange. In addition, these substances stick to the exoskeleton and may have other arthropod impairing effects. The activity of these substances hinges on their non-solubility: when covered with these substances, the animals are unable to solubilize or expel them from their organs and skeleton. However, the drawback of these effective apolar substances is that this insolubility is inconvenient when used on the treated person's hair or treated animal's hair or feathers. Surprisingly, silylated polyalcohols according to the invention were found to be effective against arthropods such as head lice while they were easily washed out after the topical treatment. This is a significant advantage over silicone (siloxane) based compounds known in the art, such as dimethicone. Moreover, compositions comprising said silylated polyalcohols showed a conditioning effect to the treated hairs, thereby providing an easy and complete hair treatment to the consumer.

A polyalcohol is to be understood as synonymous to the term "polyhydric alcohol" and can be defined as an organic molecule having two or more hydroxyl groups, i.e. two or more carbon atoms with an alcohol functionality. Prominent examples are glycol, glycerol, propylene glycol, pentaerythritol, polyether alcohols and sugar alcohols, and hydrogenated sugar alcohols. Sugar alcohols comprise, but are not limited to, arabinose, glucose, fructose, galactose, sucrose, lactose, saccharose, maltose, mannose. Said multiple hydroxyl groups are thus bound to a central organic scaffold, which central scaffold may be a functionalized or a non-functionalized hydrocarbon. In a preferred embodiment, said central scaffold is a hydrocarbon comprising 2 to 20 carbon atoms, and more preferably 2 to 12 carbon atoms, and most preferably 3, 4 or 5 carbon atoms. Preferably, said hydrocarbon is a comprised of carbon atoms having exclusively sigma-bonds. This means that the preferred polyalcohols do not have any double or triple bonds in the hydrocarbon scaffold. Preferably, said hydrocarbon does not include any phenyl groups. Said central scaffold may be a carbo- or heterocyclic structure. Said central scaffold may be a linear carbo- and/or hetero-atomic structure. Functionalized hydrocarbon scaffolds may comprise one or more functional groups selected from alkyl, alkenyl, alkynyl, benzyl, fluoro, chloro, bromo, iodo, carbonyl, aldehyde, ether, ester, carbonate ester, orthocarbonate ester, amine, amide, imine, diimide, nitro, nitrate, nitroso, and sulphur-, phosphorus- and boron-functional groups, carbo- and heterocyclic rings. Said more than one hydroxyl groups can be in vicinal positions and/or can be spaced by one or more carbon atoms. In a preferred embodiment, the polyalcohol is a polymeric polyalcohol, such as polyethylene glycol, polypropylene glycol, polyvinylalcohol, etc. Silylated polyalcohols are to be understood as polyalcohols wherein one or more hydroxyl groups, and preferably two or more hydroxyl groups and even more preferably all hydroxyl groups, have been converted to a silyl ether bond (Si—O—C) as schematically depicted in Rx 1 below.

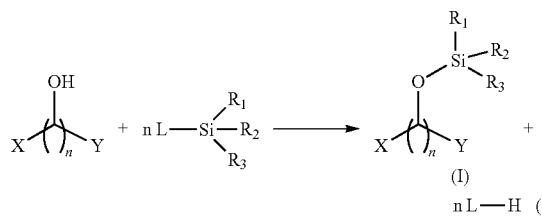

nL—H (Rx 1)

Preferably, n is an integer from 1 to 20 and more preferably from 2 to 12. The group X—(C)$_n$—Y is used to illustrate the central organic scaffold, onto which a number n of hydroxyl groups are bound.

The silylating agent L-SiR$_1$R$_2$R$_3$ may be a silylating agent known to the person skilled in the art and may be selected from Pape, P. G. 2006. Silylating Agents. Kirk-Othmer Encyclopedia of Chemical Technology. In a preferred embodiment, R$_1$, R$_2$ and R$_3$ are independently selected from H, alkyl, alkenyl, alkynyl, phenyl and alkoxy. Preferably, R$_1$, R$_2$ and R$_3$ are independently selected from H, C1-C8 alkyl, and C1-C8 alkoxy; and more preferably from C2-C4 alkyl and C2-C4 alkoxy.

Longer alkyl and/or alkoxy chains exhibit a higher hydrophobicity compared to methyl and methoxy silanes, which is beneficial with respect to anti-arthropodal activity. However, hydrophobicity should be acceptable to allow for mixing the silylated polyalcohol with a suitable carrier.

In a more preferred embodiment, the present invention provides a silylated polyalcohol according to the first aspect of the invention, wherein at least one of R$_1$, R$_2$ or R$_3$ are branched alkyl groups such as i.e. isopropyl, tertiary butyl. Preferably two and more preferably all of R$_1$, R$_2$ or R$_3$ are branched alkyl groups such as i.e. isopropyl, tertiary butyl. Bulky alkyl groups contribute to the hydrolytic stability of the silylated polyalcohol or silyl ether compounds according to the invention.

In a preferred embodiment, the present invention provides a silylated polyalcohol according to the first aspect of the invention, having at least two silyl ether groups in vicinal and/or germinal position, preferably having at least two silyl ether groups in vicinal position.

In a preferred embodiment, the present invention provides a silylated polyalcohol according to the first aspect of the invention, wherein said silylated polyalcohol comprises a main chain having multiple silyl ether side and/or end groups. This means that the position of the silyl ether in the silylated polyalcohol can be internal or terminal.

In a preferred embodiment, the present invention provides a silylated polyalcohol according to the first aspect of the invention, having a molecular weight lower than 10,000 g/mol and preferably lower than 5,000 g/mol, lower than 4,000 g/mol, lower than 3,000 g/mol, lower than 2,000 g/mol, or even lower than 1,500 g/mol, and more preferably lower than 1000 g/mol, i.e. between 100 g/mol and 1000 g/mol. Preferably, said silylated polyalcohol has a molecular weight of at least 110 g/mol, at least 120 g/mol, at least 130 g/mol, at least 140 g/mol, at least 150 g/mol, at least 175 g/mol, at least 200 g/mol, at least 225 g/mol, or at least 250 g/mol; and of at most 900 g/mol, at most 800 g/mol, at most 750 g/mol, at most 700 g/mol, at most 675 g/mol, at most 650 g/mol, at most 625 g/mol, at most 600 g/mol, at most 575 g/mol, at most 550 g/mol, at most 525 g/mol, at most 500 g/mol, at most 475 g/mol, at most 450 g/mol or at most 425 g/mol. Preferred embodiments of said silylated polyalcohol have a molecular weight between 150 g/mol and 750 g/mol, and more preferably between 160 g/mol and 625 g/mol. Even more preferably, said silylated polyalcohol has a molecular weight higher than 200 g/mol, 220 g/mol, 240 g/mol, 260 g/mol, 280 g/mol or 300 g/mol, and lower than 600 g/mol, 580 g/mol, 560 g/mol, 540 g/mol, 520 g/mol or 500 g/mol. Most preferably, said silylated polyalcohol has a molecular weight of about 300 g/mol, 325 g/mol, 350 g/mol, 375 g/mol, 400 g/mol, 425 g/mol, 450 g/mol or 475 g/mol. Without being bound by any mechanistic theories, the inventors assume that a sufficiently low molecular weight allows for a good uptake by the to be treated arthropods and a high efficiency of treatment is obtained. In accordance, experiments indicate that silylated polyalcohols with lower molecular weights exhibit higher ovicidal and adulticidal activity.

Preferred examples of silylated polyalcohols are 1,2-bis(trimethylsiloxy)ethane, 1,2-bis(trimethylsiloxy)propane, 1,3-bis(trimethylsiloxy)propane, 2-methyl-1,3-bis(trimethylsiloxy)propane, 2,2-dimethyl-1,3-bis(trimethylsiloxy)propane, 1,2,3-tris(trimethylsiloxy)propane, 1,2-bis(trimethylsiloxy)butane, 1,3-bis(trimethylsiloxy)butane, 1,4-bis(trimethylsiloxy)butane, 1,2,3-tris(trimethylsiloxy)butane, 1,2,4-tris(trimethylsiloxy)butane, 1,2-bis(trimethylsiloxy)pentane, 1,3-bis(trimethylsiloxy)pentane, 1,4-bis(trimethylsiloxy)pentane, 1,5-bis(trimethylsiloxy)pentane, 1,2,3-tris(trimethylsiloxy)pentane, 1,2,4-tris(trimethylsiloxy)pentane, 1,2,5-tris(trimethylsiloxy)pentane, 1,3,4-tris(trimethylsiloxy)pentane, 1,3,5-tris(trimethylsiloxy)pentane, 1,2,3,4-tetrakis (trimethylsiloxy)pentane, 1,2,3,5-tetrakis(trimethylsiloxy)pentane, 1,2,4,5-tetrakis(trimethylsiloxy)pentane, and alkoxy or alkyl homologues thereof, preferably alkyl homologues thereof such as 1,2-bis(triethylsiloxy)ethane, 1,2-bis(tri-n-propylsiloxy)ethane, 1,2-bis(tri-n-butylsiloxy)ethane, 1,2,3-tris(triethylsiloxy)propane, 1,2,3-tris(tri-n-propylsiloxy)propane, 1,2,3-tris(tri-n-butylsiloxy)propane, etc.

In a preferred embodiment, the present invention provides a silylated polyalcohol according to the first aspect of the invention, having a viscosity lower than 25.0 Pa·s at 25° C. as determined using a Brookfield viscosimeter using a spindle speed of 40 rpm, and preferably lower than 20.0 Pa·s at 25° C. Preferably, said silylated polyalcohol has a viscosity lower than 15.0 Pa·s, 12.0 Pa·s, 10.0 Pa·s, 8.0 Pa·s or 5.0 Pa·s at 25° C. Most preferably, said silylated polyalcohol has a viscosity of about 0.8 Pa·s, 1.0 Pa·s, 1.2 Pa·s, 1.4 Pa·s, 1.6 Pa·s, 1.8 Pa·s, 2.0 Pa·s, 2.2 Pa·s, 2.4 Pa·s or 2.6 Pa·s at 25° C., or any value there in between. Without being bound by any mechanistic theories, the inventors assume that a sufficiently low viscosity allows for a good distribution of the silylated alcohols to the subject. Hence, a good contact with the to be treated arthropods is achieved and a high efficiency of treatment is obtained. In accordance, experiments indicate that silylated polyalcohols with lower viscosity exhibit higher ovicidal and adulticidal activity.

In a preferred embodiment, the present invention provides a silylated polyalcohol according to the first aspect of the invention, wherein said silylated polyalcohol is hydrophobic, as determined by an A log P98 value higher than 0.000. Preferably, said silylated polyalcohol has an A log P98 value higher than 1.000 and lower than 10.000, and more preferably higher than 2.000 and lower than 8.000. Even more preferably, said silylated polyalcohol has an A log P98 value higher than 2.500, 2.750, 3.000, 3.250, 3.500, 3.750, 4.000, 4.250 or 4.500, and lower than 8.000, 7.750, 7.500, 7.250, 7.000, 6.750 or 6.500. Most preferably, said silylated polyalcohol has an A log P98 value of about 4.500, 4.750, 5.000, 5.250, 5.500, 5.750, 6.000, 6.250 or 6.500 or any value there in between. This is advantageous, as experiments indicate that more hydrophobic silylated polyalcohols with higher A log P98 values exhibit higher ovicidal and adulticidal activity. On the other hand, when the silylated polyalcohol is too high, its formulation in a suitable, more hydrophilic carrier becomes impaired.

In the context of the present invention, the term "log P" is to be regarded as equivalent to the term "A log P98." P is the partition coefficient and is defined as a particular ratio of the concentrations of a solute between 2-octanol and water, and the logarithm of the ratio is thus log P. The log P value is therefore a measure of lipophilicity or hydrophobicity. A log P98 is the log P value of a solute as calculated using QSAR methods, Hansch, C., Leo, A., D. Hoekman. Exploring QSAR-Hydrophobic, Electronic, and Steric Constants. Washington, D.C.: American Chemical Society, 1995, p. 7.

In a preferred embodiment, the present invention provides a silylated polyalcohol according to the first aspect of the invention, wherein at least one alcohol group is silylated, and preferably at least two alcohol groups are silylated. Silylation of at least two alcohol groups provides higher ovicidal and adulticidal activity. Preferably, said a silylated polyalcohol has between two and six silylated alcohol groups, more preferably between two and four silylated alcohol groups and most preferably three or four silylated alcohol groups.

In a preferred embodiment, the present invention provides a silylated polyalcohol according to the first aspect of the invention, wherein at least 50% of all alcohol groups are silylated. More preferably, at least 60%, 70%, 80%, 85%, 90% or even at least 95% of all alcohol groups are silylated. In a most preferred embodiment, the present invention provides a silylated polyalcohol according to the first aspect of the invention, wherein all alcohol groups are silylated. Such compounds are easy to obtain by reaction with an amount of the silylating agent equivalent, or in slight excess, to the number of hydroxyl groups, and separating the obtained silylated polyalcohols from the side products.

The "pharmaceutically acceptable salts" as mentioned hereinbefore or hereinafter are meant to comprise the therapeutically active non-toxic acid addition salt forms which the silylated polyalcohol according to the invention are able to form. Said acid addition salts can be obtained by treating the base form of the silylated polyalcohol with appropriate acids, for example inorganic acids, for example hydrohalic acid, in particular hydrochloric acid, hydrobromic acid, sulfuric acid, nitric acid and phosphoric acid; organic acids, for example acetic acid, hydroxyacetic acid, propanoic acid, lactic acid, pyruvic acid, oxalic acid, malonic acid, succinic acid, maleic acid, fumaric acid, malic acid, tartaric acid, citric acid, methanesulfonic acid, ethanesulfonic acid, benzenesulfonic acid, p-toluenesulfonic acid, cyclamic acid, salicyclic acid, p-aminosalicylic acid and pamoic acid.

The silylated polyalcohol according to the invention containing acidic protons may be converted into their therapeutically active non-toxic metal or amine addition salt forms by treatment with appropriate organic and inorganic bases. The pharmaceutically acceptable salts as mentioned hereinbefore or hereinafter are meant to also comprise the therapeutically active non-toxic metal or amine addition salt forms (base addition salt forms) which the silylated polyalcohol according to the invention are able to form. Appropriate base addition salt forms comprise, for example, the ammonium salts, the alkali and earth alkaline metal salts, e.g. the lithium, sodium, potassium, magnesium, calcium salts and the like, salts with organic bases, e.g. primary, secondary and tertiary aliphatic and aromatic amines such as methylamine, ethylamine, propylamine, isopropylamine, the four butylamine isomers, dimethylamine, diethylamine, diethanolamine, dipropylamine, diisopropylamine, di-n-butylamine, pyrrolidine, piperidine, morpholine, trimethylamine, triethylamine, tripropylamine, quinuclidine, pyridine, quinoline and isoquinoline, the benzathine, N-methyl-D-glucamine, 2-amino-2-(hydroxymethyl)-1,3-propanediol, hydrabamine salts, and salts with amino acids such as, for example, arginine, lysine and the like. Conversely, said acid or base addition salt forms can be converted into the free forms by treatment with an appropriate base or acid.

The term "pharmaceutically acceptable salt" also comprises the quaternary ammonium salts (quaternary amines) which the silylated polyalcohol according to the invention are able to form by reaction between a basic nitrogen in the main chain of the silylated polyalcohol and an appropriate quaternizing agent, such as, for example, an optionally substituted C1-6 alkyl halide, aryl C1-6 alkyl halide, C1-6 alkyl carbonyl halide, aryl carbonyl halide, Het-C1-6 alkyl halide or Het-carbonyl halide, e.g. methyl iodide or benzyl iodide. Preferably, "Het" represents a monocyclic heterocycle selected from furanyl or thienyl; or a bicyclic heterocycle selected from benzofuranyl or benzothienyl; each monocyclic and bicyclic heterocycle may optionally be substituted with 1, 2 or 3 substituents, each substituent independently selected from the group of halogen, alkyl and aryl. Preferably, the quaternizing agent is C1-6 alkyl halide. Other reactants with good leaving groups may also be used, such as C1-6 alkyl trifluoromethane sulfonates, C1-6 alkyl methane sulfonates, and C1-6 alkyl p-toluene sulfonates. A quaternary amine has a positively charged nitrogen. Pharmaceutically acceptable counter ions include chloro, bromo, iodo, trifluoro acetate, acetate, triflate, sulfate, sulfonate. Preferably, the counter ion is iodo. The counter ion of choice can be introduced using ion exchange resins.

The term "solvate" comprises the hydrates and solvent addition forms which the silylated polyalcohols according to the invention are able to form, as well as the salts thereof. Examples of such forms are e.g. hydrates, alcoholates and the like.

The term "polymorph" refers to the ability of the silylated polyalcohol according to the invention to exist in more than one form or crystal structure.

In the context of this application, a compound according to the invention is inherently intended to comprise all stereochemically isomeric forms thereof. The term "stereochemically isomeric forms" as used hereinbefore or hereinafter defines all the possible stereoisomeric forms which the silylated polyalcohol according to the invention, and their N-oxides, pharmaceutically acceptable salts, solvates or physiologically functional derivatives may possess. Unless otherwise mentioned or indicated, the chemical designation of compounds denotes the mixture of all possible stereochemically isomeric forms. In particular, stereogenic centers may have the R- or S-configuration; substituents on bivalent cyclic (partially) saturated radicals may have either the cis- or trans-configuration. Compounds encompassing double bonds can have an E (entgegen)- or Z (zusammen)-stereochemistry at said double bond. The terms cis, trans, R, S, E and Z are well known to a person skilled in the art. Stereochemically isomeric forms of the silylated polyalcohols according to the invention are obviously intended to be embraced within the scope of this invention. Of special interest are those silylated polyalcohols according to the invention which are stereochemically pure.

Following CAS-nomenclature conventions, when two stereogenic centres of known absolute configuration are present in a molecule, an R or S descriptor is assigned (based on Cahn-Ingold-Prelog sequence rule) to the lowest-numbered chiral centre, the reference centre. The configuration of the second stereogenic centre is indicated using relative descriptors [R*,R*] or [R*,S*], where Rx is always specified as the reference centre and [R*,R*] indicates centres with the same chirality and [R*,S*] indicates centres of unlike chirality. For example, if the lowest-numbered chiral centre in the molecule has an S configuration and the second centre is R, the stereo descriptor would be specified as S—[R*,S*]. If "a" and "0" are used: the position of the highest priority substituent on the asymmetric carbon atom in the ring system having the lowest ring number, is arbitrarily always in the "a" position of the mean plane determined by the ring system. The position of the highest priority substituent on the other asymmetric carbon atom in the ring system relative to the position of the highest priority substituent on the reference atom is denominated "a", if it is on the same side of the mean plane determined by the ring system, or "0", if it is on the other side of the mean plane determined by the ring system.

When a specific stereoisomeric form is indicated, this means that said form is substantially free, i.e. associated with less than 50%, preferably less than 20%, more preferably less than 10%, even more preferably less than 5%, further preferably less than 2% and most preferably less than 1% of the other isomer(s). Thus, when a silylated polyalcohol according to the invention is for instance specified as (R, S), this means that the compound is substantially free of the (S, R) isomer.

The silylated polyalcohols according to the invention may be synthesized in the form of mixtures, in particular racemic mixtures, of enantiomers which can be separated from one another following art-known resolution procedures. The racemic silylated polyalcohols according to the invention may be converted into the corresponding diastereomeric salt forms by reaction with a suitable chiral acid. Said diastereomeric salt forms are subsequently separated, for example, by selective or fractional crystallization and the enantiomers are liberated therefrom by alkali. An alternative manner of separating the enantiomeric forms of the silylated polyalcohols according to the invention involves liquid chromatography using a chiral stationary phase. Said pure stereochemically isomeric forms may also be derived from the corresponding pure stereochemically isomeric forms of the appropriate starting materials, provided that the reaction occurs stereospecifically. Preferably if a specific stereoisomer is desired, said compound will be synthesized by stereospecific methods of preparation. These methods will advantageously employ enantiomerically pure starting materials.

The tautomeric forms of the silylated polyalcohols according to the invention are meant to comprise those silylated polyalcohol according to the invention wherein e.g. an enol group is converted into a keto group (keto-enol tautomerism). Tautomeric forms of the silylated polyalcohols according to the invention or of intermediates of the present invention are intended to be embraced by the ambit of this invention.

The N-oxide forms of the present compounds are meant to comprise the silylated polyalcohols according to the invention wherein one or several tertiary nitrogen atoms are oxidized to the so-called N-oxide. The silylated polyalcohols according to the invention may be converted to the corresponding N-oxide forms following art-known procedures for converting a trivalent nitrogen into its N-oxide form. Said N-oxidation reaction may generally be carried out by reacting the starting material of the silylated polyalcohols according to the invention with an appropriate organic or inorganic peroxide. Appropriate inorganic peroxides comprise, for example, hydrogen peroxide, alkali metal or earth alkaline metal peroxides, e.g. sodium peroxide, potassium peroxide; appropriate organic peroxides may comprise peroxy acids such as, for example, benzene carboperoxoic acid or halo substituted benzenecarboperoxoic acid, e.g. 3-chlorobenzenecarboperoxoic acid, peroxoalkanoic acids, e.g. peroxoacetic acid, alkylhydroperoxides, e.g. t-butyl hydro-peroxide. Suitable solvents are, for example, water, lower alcohols, e.g. ethanol and the like, hydrocarbons, e.g. toluene, ketones, e.g. 2-butanone, halogenated hydrocarbons, e.g. dichloromethane, and mixtures of such solvents.

In the framework of this application, a silylated polyalcohol according to the invention is inherently intended to comprise all isotopic combinations of its chemical elements. In the framework of this application, a chemical element, in particular when mentioned in relation to a silylated polyalcohol according to the invention, comprises all isotopes and isotopic mixtures of this element, either naturally occurring or synthetically produced, either with natural abundance or in an isotopically enriched form. In particular, when hydrogen is mentioned, it is understood to refer to $^{1}H$, $^{2}H$, $^{3}H$ and mixtures thereof; when carbon is mentioned, it is understood to refer to $^{11}C$, $^{12}C$, $^{13}C$, $^{14}C$ and mixtures thereof; when nitrogen is mentioned, it is understood to refer to $^{13}N$, $^{14}N$, $^{15}N$ and mixtures thereof; when oxygen is mentioned, it is understood to refer to $^{14}O$, $^{15}O$, $^{16}O$, $^{17}O$, $^{18}O$ and mixtures thereof; and when fluoro is mentioned, it is understood to refer to $^{18}F$, $^{19}F$ and mixtures thereof. A compound according to the invention therefore inherently comprises a compound with one or more isotopes of one or more element, and mixtures thereof, including a radioactive compound, also called radio labelled compound, wherein one or more nonradioactive atoms has been replaced by one of its radioactive isotopes. By the term "radio labelled compound" is meant any silylated polyalcohol according to the invention, a pharmaceutically acceptable salt thereof or an N-oxide form thereof or a solvate thereof, which contains at least one radioactive atom. For example, a compound can be labelled with positron or with gamma emitting radioactive isotopes. For radio ligand binding techniques (membrane receptor assay), the $^{3}H$-atom or the $^{125}I$-atom is the atom of choice to be replaced. For imaging, the most commonly used positron emitting (PET) radioactive isotopes are $^{11}C$, $^{18}F$, $^{15}O$ and $^{13}N$, all of which are accelerator produced and have half-lives of 20, 100, 2 and 10 minutes respectively. Since the half-lives of these radioactive isotopes are so short, it is only feasible to use them at institutions which have an accelerator on site for their production, thus limiting their use. The most widely used of these are $^{18}F$, $^{99m}Tc$, $^{201}Tl$ and $^{123}I$. The handling of these radioactive isotopes, their production, isolation and incorporation in a molecule are known to the skilled person. In particular, the radioactive atom is selected from the group of hydrogen, carbon, nitrogen, sulfur, oxygen and halogen. Preferably, the radioactive atom is selected from the group of hydrogen, carbon and halogen. In particular, the radioactive isotope is selected from the group of $^3$H, $^{11}$C, $^{18}$F, $^{122}$I, $^{123}$I, $^{125}$I, $^{131}$I, $^{75}$Br, $^{76}$Br, $^{77}$Br and $^{82}$Br. Preferably, the radioactive isotope is selected from the group of $^3$H, $^{11}$C and $^{18}$F.

2. Use of Silylated Polyalcohols

In a second aspect, the present invention provides a silylated polyalcohol according to the first aspect of the invention for use as a medicament. Preferably, the present invention provides a silylated polyalcohol according to the first aspect of the invention for use in a human or animal in need thereof.

In a third aspect, the present invention provides a silylated polyalcohol according to the first aspect of the invention for use in treatment or prevention of infection or infestation by arthropods in a human or animal in need thereof. The term "arthropod" refers to members of the arthropod phyllum, including, but not limited to the hexapod insects but also ticks, spiders, scorpions, centipedes, millipedes. Insects include, but are not limited to the species in the orders of diptera, phthiraptera, heteroptera, hemiptera, hymenoptera, blattodea, trichoptera, lepidoptera, orthoptera, thriptera and coleopteran. In a preferred embodiment, the arthropod is selected of the group comprising lice such as sucking lice or chewing lice, bugs such as bat bugs or bed bugs, fleas, ticks and mites. In a more preferred embodiment, the arthropod is selected of the group comprising lice such as sucking lice or chewing lice, bed bugs, fleas, ticks and mites. In an even more preferred embodiment, the arthropod is selected of the group comprising lice such as sucking lice or chewing lice, fleas, ticks. Most preferably, the arthropod is lice such as sucking lice or chewing lice.

In accordance with the present invention, the silylated polyalcohols as defined herein are used for killing arthropods and their eggs in a subject in need thereof. The term "killing" as used herein includes repelling, reducing in number, and eradicating said arthropods, e.g. ectoparasites, and/or their eggs. Use of the present silylated polyalcohols for killing arthropods and/or their eggs includes prophylactic use.

The silylated polyalcohols or compositions thereof according to the present invention are useful in the killing of arthropods, particularly terrestrial arthropods, especially insects and arachnids, and their eggs. Insects include ectoparasites. Ectoparasites include sucking and biting lice, fleas, keds, mites and ticks. In particular, said silylated polyalcohols or compositions thereof have pediculicidal activity, and are therefore especially useful for treating infestations of lice in animals, including humans. Preferably, said ectoparasites are lice, fleas and/or ticks, mites, and/or their eggs.

Sucking lice (Anoplura) and biting lice (Mallophaga, a parafylletic name for Rhyncophthirina, Ischnocera and Amblycera) are parasites found on nearly all groups of mammals and birds. They include such species as *Haematopinus* spp., *Linognathus* spp., *Solenopotes* spp., *Pediculus* spp., and *Pthirus* spp. *Pediculus* spp. include *Pediculus humanus*, e.g. the head louse *Pediculus humanus capitis* and the body or clothing louse *Pediculus humanus humanus*. *Pthirus* spp. includes the crab louse *Pthirus pubis*.

Ticks are the largest group of the subclass Acari and are obligate blood-sucking ectoparasites of land vertebrates. Certain species are pests of domestic livestock, while another group transmits human disease. Ticks are classified into three families, all but one species belonging to the Ixodidae (hard ticks) for to the Argasidae (soft ticks). The present silylated polyalcohols and compositions thereof can be used to kill soft as well as hard ticks.

The present silylated polyalcohols or compositions thereof are also useful for the control of other arthropods, including for example public health pests e.g. cockroaches and bed bugs; nuisance arthropods e.g. wasps, ants, silver fish and woodlice; and structural pests e.g. furniture beetles, deathwatch beetles and other wood borers.

Arthropod eggs include eggs of ectoparasites as defined herein and include but are not limited to eggs of sucking and biting lice—also called nits or ova—, eggs of fleas, keds, mites and ticks.

Preferably, the silylated polyalcohols or compositions thereof are used on mammalian skin and avian feathers, respectively. On humans, it is applicable to the treatment of hair and scalp. Human hair care products according to the present invention can be used in conventional ways and generally involve the application of an effective amount of the hair product onto wet or dry hair, preferably on dry hair, and on the scalp. The silylated polyalcohols or compositions thereof are left in/on the hair for about 5 minutes to 8 hours and are subsequently removed by rinsing and effortlessly washing the hair. Surprisingly, such silylated polyalcohols were found to be effective against arthropods such as head lice despite being easily washed out after the topical treatment. This is a significant advantage over silicon based compounds known in the art, such as dimethicone. Moreover, compositions comprising said silylated polyalcohols showed a conditioning effect to the treated hairs, thereby providing an easy and complete hair treatment to the consumer. The silylated polyalcohols or compositions thereof are distributed throughout the hair, typically by rubbing or massaging the hair and scalp with ones' hands or by another's hands. An effective amount of the composition comprising one or more silylated polyalcohol, typically from about 1 gram to about 100 grams, preferably from about 10 grams to about 30 grams, is applied.

The silylated polyalcohols or compositions thereof of the present invention may be used in a conventional manner.

An effective amount of the composition, typically from about 1 gram to about 200 grams, for instance from about 30 grams to about 150 grams or from about 1 gram to about 100 grams, or from about 10 grams to about 30 grams is applied.

The method for treating hair for instance comprises the steps of: (a) applying an effective amount of the silylated polyalcohols or compositions thereof to the wet or dry hair and the scalp, (b) working the silylated polyalcohols or compositions thereof in contact with the hair and scalp, especially to the region behind the ears and the hairline at the back of the head, (c) leaving the silylated polyalcohols or compositions thereof on the hair for a suitable period of time to allow killing to occur and (d) rinsing the silylated polyalcohols or compositions thereof from the hair using water alone or water and soap. Application of the silylated polyalcohols or compositions thereof to the hair typically includes working the silylated polyalcohols or compositions thereof through the hair, generally with the hands and fingers. The silylated polyalcohols or compositions thereof is left into contact with the hair, e.g. for about 5 or 10 minutes to 8 hours. The silylated polyalcohols or compositions thereof is then rinsed from the hair with water and optionally soap (e.g. a shampoo).

The method for treating the skin for instance comprises the steps of: (a) applying an effective amount of the silylated polyalcohols or compositions thereof to the skin, (b) leaving the silylated polyalcohols or compositions thereof on the skin for a suitable period of time to allow killing to occur and (c) rinsing the silylated polyalcohols or compositions thereof from the skin using water or water and soap. The silylated polyalcohols or compositions thereof can be left into contact with the skin, e.g. for about 5 or 10 minutes to 8 hours. The silylated polyalcohols or compositions thereof is then rinsed from the skin with water and optionally soap.

The method steps can be repeated as many times as desired to achieve the sought effects. But preferably the treatment is repeated after 7 days. To kill off the hatched lice that were not killed in the first treatment.

3. Compositions Comprising Silylated Polyalcohols

In a fourth aspect, the present invention provides a composition comprising at least one silylated polyalcohol according to the first aspect of the invention and a suitable carrier.

In a preferred embodiment, the present invention provides a composition according to the fourth aspect of the invention, wherein said silylated polyalcohol is comprised in an amount of 0.1 to 25 wt. %. Preferably, said silylated polyalcohol is comprised in an amount of 0.5 to 15 wt. % and more preferably in an amount of 1 to 10 wt. %. Most preferably, said silylated polyalcohol is comprised in an amount of 2, 3, 4, 5, 6 or 7 wt. %.

In a preferred embodiment, the present invention provides a composition according to the fourth aspect of the invention, wherein said silylated polyalcohol is a mixture of two or more silylated polyalcohols. Preferably, said silylated polyalcohol is a mixture of a partially or completely silylated polyalcohol. More preferably, said completely silylated polyalcohol is comprised in an amount larger than 20 mol-%, larger than 30 mol-%, larger than 40 mol-%, larger than 50 mol-%, larger than 60 mol-%, larger than 75 mol-% or even larger than 80 mol-%, relative to the total amount of silylated polyalcohols; and said partially silylated polyalcohol is comprised in an amount smaller than 80 mol-%, smaller than 70 mol-%, smaller than 60 mol-%, smaller than 50 mol-%, smaller than 40 mol-%, smaller than 25 mol-% or even smaller than 20 mol-%, relative to the total amount of silylated polyalcohols. Most preferably, said completely silylated polyalcohol is comprised in an amount of about 85 mol-%, 90 mol-%, 95 mol-%, 98 mol-% or 99 mol-%, or any value there in between; and said partially silylated polyalcohol is comprised in an amount of about 15 mol-%, 10 mol-%, 5 mol-%, 2 mol-%, 1 mol-%, or any value there in between.

Carrier

In a preferred embodiment, the present invention provides a composition according to the fourth aspect of the invention, wherein said carrier is hydrophilic, as determined by an A log P98 value lower than 1.000 and preferably lower than 0.000. In a preferred embodiment, the present invention provides a composition according to the fourth aspect of the invention, wherein said carrier has an A log P98 value lower than −1.000 and higher than −10.000, and more preferably lower than −1.000 and higher than −6.000. Even more preferably, said carrier has an A log P98 value of about −1.000, −1.500, −2.000, −2.500, −3.000, −3.500 or −4.000 or any value there in between. Examples of suitable carriers are non-toxic hydrophilic solvents such as water, ethylene glycol, 1,2- and 1,3-propylene glycol and glycerol, preferably ethylene glycol, 1,2-propylene glycol and glycerol. In a preferred embodiment, said carrier is an alcohol such as n-propanol, i-propanol, i-butanol, s-butanol, glycol, 1,2-propylene glycol and glycerol. In a more preferred embodiment, said carrier is a polar aprotic solvent such as N,N'-dimethylformamide, acetonitrile, sulfolane, dimethylsulfoxide, polar glycol ethers such as 1,2-dimethoxyethane, diethylene glycol dimethyl ether or propylene carbonate. Such carriers aid in the stability of the silyl ether groups. In an especially preferred embodiment, said carrier is a polar, polymeric compound, such as polyethylene glycol (PEG) having a molecular weight of between 100 g/mol and 1000 g/mol, and preferably between 200 g/mol and 500 g/mol. More preferably, said polyethylene glycol is an end-capped PEG whereby the terminal groups are i.e. methyl groups, silyl ether groups or other hetero groups without reactive hydrogen atoms.

In a preferred embodiment, the present invention provides a composition according to the fourth aspect of the invention, having a viscosity lower than 25.0 Pa·s at 25° C. and preferably lower than 20.0 Pa·s at 25° C. as determined using a Brookfield viscosimeter using a spindle speed of 40 rpm. Preferably, said carrier has a viscosity lower than 15.0 Pa·s, 12.0 Pa·s, 10.0 Pa·s, 8.0 Pa·s or 5.0 Pa·s at 25° C. Most preferably, said carrier has a viscosity of about 0.8 Pa·s, 1.0 Pa·s, 1.2 Pa·s, 1.4 Pa·s, 1.6 Pa·s, 1.8 Pa·s, 2.0 Pa·s, 2.2 Pa·s, 2.4 Pa·s or 2.6 Pa·s at 25° C., or any value there in between. Without being bound by any mechanistic theories, the inventors assume that a sufficiently low viscosity allows for a good distribution of the silylated alcohols in the composition to the subject. Hence, a good contact with the to be treated arthropods is achieved and a high efficiency of treatment is obtained. In accordance, experiments indicate that carriers with lower viscosity exhibit higher ovicidal and adulticidal activity.

In a preferred embodiment, the present invention provides a composition according to the fourth aspect of the invention, comprising less than 20 wt. % of water. The water present in the composition may induce decomposition of the silylated polyalcohols via hydrolysis. More preferably, the composition comprises less than 10 wt. % of water, preferably less than 5 wt. % of water, and even more preferably less than 2 wt. % or even less than 1 wt. % of water.

In a preferred embodiment, the present invention provides a composition according to the fourth aspect of the invention, comprising at least one silylated polyalcohol according to the first aspect of the invention and a suitable carrier. Upon formulation, the silylated polyalcohols and the carrier form two separate phase. Surprisingly, the two phase system transforms to a clear, one phase system upon intense mixing of the two phases. It was also observed that the final composition has a lower viscosity compared to the viscosity of the carrier alone. As indicated above, a lower viscosity is advantageous since it allows for a better provision of the silylated polyalcohol to the target arthropods, thereby effectively killing the arthropods.

In an alternative embodiment, the present invention provides a composition according to the fourth aspect of the invention, wherein said carrier is an oil, such as a mineral oil, a vegetable oil, an essential oil, or any combination of two or more of the aforementioned oils. Mineral oils are known to the person skilled in the art as higher alkanes from a mineral source and mixtures thereof. Typical examples of vegetable oils are almond oil, apricot kernel oil, avocado oil, borage seed oil, camellia seed oil (tea oil), coconut oil (fractionated), coconut oil (virgin), cranberry seed oil, evening primrose oil, grapeseed oil, hazelnut oil, hemp seed oil, jojoba, kukui nut oil, macadamia nut oil, meadowfoam oil, olive oil, peanut oil, pecan oil, pomegranate seed oil, rose hip oil, seabuckthorn berry oil, sesame oil, sunflower oil and watermelon seed oil. Mineral oils are known to the person skilled in the art as concentrates of aromatic compounds obtained from plants.

Additives

In addition to the essential components described hereinbefore, the present compositions may further comprise one or more optional components that are known or otherwise suitable for use on human/animal hair or skin. Non-limiting examples of such optional components include for instance a foaming agent, plasticizers and humectants (such as glycerol, propane-1,2-diol, polypropylene glycol and other polyhydric alcohols), free radical scavengers, viscosity-adjusting agents, dyes and colorants, perfumes, preservatives and the like. In a preferred embodiment, the present composition further comprises a foaming agent. Foaming agents are agents, which promote the formation of the foam. Any agent having a surfactant character may be used. The surfactants may be cationic, non-ionic or anionic. Examples of suitable foaming agents include, but are not limited to cetrimide, lecithin, soaps, and the like, and for instance, anionic (based on sulfate, sulfonate or carboxylate anions): sodium dodecyl sulfate (SDS), ammonium lauryl sulfate, and other alkyl sulfate salts, Sodium laureth sulfate, also known as sodium lauryl ether sulfate (SLES), alkyl benzene sulfonate; soaps or fatty acid salts (see acid salts); cationic (based on quaternary ammonium cations): cetyl trimethylammonium bromide (CTAB) a.k.a. hexadecyl trimethyl ammonium bromide, and other alkyltrimethylammonium salts, cetylpyridinium chloride (CPC), polyethoxylated tallow amine (POEA), benzalkonium chloride (BAC), benzethonium chloride (BZT); zwitterionic (amphoteric): dodecyl betaine, dodecyl dimethylamine oxide, cocamidopropyl betaine, coco ampho glycinate; nonionic: alkyl poly(ethylene oxide), alkyl polyglucosides, including: octyl glucoside, decyl maltoside, fatty alcohols, cetyl alcohol, oleyl alcohol. Commercially available surfactants such as TWEEN™ are also suitable.

In a preferred embodiment, the compositions according to the invention are stored at room temperature, and preferably at a temperature below room temperature, such as at a temperature below 20° C., below 15° C., below 10° C. or below 5° C. Preferably, said compositions are stored at a temperature of about 4° C. For reasons of effective handling, it is preferred that the compositions are stored at a temperature above the melting temperature of the carrier.

4. Use of Compositions Comprising Silylated Polyalcohols

In a fifth aspect, the present invention provides a composition according to the fourth aspect of the invention for use as a medicament.

In a sixth aspect, the present invention provides a composition according to the fourth aspect of the invention for use in treatment or prevention of infection or infestation by arthropods. The term "arthropod" refers to members of the arthropod phylum, including the hexapod insects but also other arthropods from diverse subphyla such as ticks, spiders, mites, wood lice, centipedes, millipedes. Insects include, but are not limited to the life stages of hematophagous or nuisance species from but not limited to the orders of diptera, phthiraptera, heteroptera, hemiptera, hymenoptera, blattodea, trichoptera, lepidoptera, orthoptera, thriptera and coleopteran. In accordance with the present invention, the compositions as defined herein are used for killing arthropods and/or their eggs, nymphs and juvenile life stages. The term "killing" as used herein includes repelling, reducing in number, and eradicating said arthropods, e.g. ectoparasites, and/or their eggs. Use of the present compositions for killing arthropods and/or their eggs includes prophylactic use.

5. Preparation of Silylated Polyalcohols and Compositions Thereof

Silylated polyalcohols or silyl ethers can easily be prepared from polyalcohols by reaction with a silylating agent L-$SiR_1R_2R_3$ according to Rx 1, wherein L is a leaving group and $R_1$, $R_2$ and $R_3$ are valence groups. Suitable leaving groups L in Rx 1 are dinitrogen, dialkyl ether, perfluoroalkyl sulfonate (such as triflate), tosylate, mesylate, iodide, bromide, chloride, water, alcohol, nitrate, phosphate, thiolate, amine, ammonia, carboxylate, phenoxide, hydroxide and alkoxide.

Alternatively, a composition comprising one or more silylated polyalcohols is obtainable by addition of a sub-stoichiometric amount of silylating agent or silane to a polyalcohol. I.e., addition of 0.04 equivalents of trimethylsilyl chloride to glycerol provides a composition comprising about 4 wt. % of 1-trimethylsiloxy-2,3-propandiol in glycerol; and addition of 0.04 equivalents of trimethylsilyl chloride to 1,2-propylene glycol provides a composition comprising about 4 wt. % of 1-trimethylsiloxy-2-propanol in 1,2-propylene glycol.

Furthermore, it was surprisingly observed that a composition comprising a silylated polyalcohol, wherein two or more alcohol groups are silylated, in a polyalcohol carrier provides a composition wherein the polyalcohol carrier is silylated upon moderate heating at a temperature of between 20° C. and 120° C., more preferably at a temperature between 40° C. and 80° C. I.e., a composition of 1,2,3-tris (trimethylsiloxy)-propane in glycerol or in 1,2-propylene glycol provides a composition comprising 1-trimethylsiloxy-2,3-propandiol in glycerol or 1-trimethylsiloxy-2-propanol in 1,2-propylene glycol, respectively, upon moderate heating.

In a seventh aspect, the present invention provides a method for preparing a composition according to the fourth aspect of the invention comprising the step of mixing one or more silylated polyalcohols according to the first aspect of the invention with a suitable carrier to form a composition according to the fourth aspect of the invention.

6. Dispensing Device for Silylated Polyalcohols and Compositions Thereof

In an eight aspect, the present invention provides a multi-chamber dispensing device, more specifically a dual chamber bottle, comprising at least a first chamber comprising a silylated polyalcohol and a second chamber, said second chamber optionally comprising a solvent, whereby said first chamber and said second chamber are separated by a seal. Preferably, said seal is arranged to form a fluid connection between said first chamber and said second chamber upon breaking said seal. Preferably, said dispensing device comprises actuating means for breaking said seal. Preferably, said silylated polyalcohol is a silylated polyalcohol according to the first aspect of the invention. This is advantageous to allow straightforward preparation of a composition for use in the treatment of arthropods.

In a preferred embodiment, the present invention provides a multi-chamber dispensing device according to the eight aspect of the invention, wherein the ratio of the volume of said second chamber to the volume of a silylated polyalcohol according to the first aspect of the invention in said first chamber is comprised between 2:1 and 100:1. Preferably, said ratio is higher than 4:1, higher than 5:1, higher than 10:1, and even higher than 20:1. Preferably, said ratio is lower than 100:1, lower than 50:1, and even higher than 30:1. This allows for a straightforward preparation of a solution or composition comprising the silylated polyalcohol according to the first aspect of the invention whereby an appropriate concentration of the silylated polyalcohol in a suitable carrier is provided. Thus, a consumer or a subject in need thereof can easily prepared a solution comprising about 2 to 10 wt. % of silylated polyalcohol according to the first aspect of the invention in a suitable carrier. I.e., the dispensing device can be provided with instructions to the user. Such user instructions may indicate to fill said second chamber with water; connect the first chamber comprising a silylated polyalcohol with said seal to said second chamber; break the seal by actuating the seal breaking means; and, optionally, agitating the multi-chamber dispensing device.

Preferably, said user instructions further indicate storage of the dispensing device In a preferred embodiment, the present invention provides a multi-chamber dispensing device according to the eight aspect of the invention, wherein said solvent is water, ethylene glycol, 1,2- and 1,3-propylene glycol and glycerol, preferably ethylene glycol, 1,2-propylene glycol and glycerol. In a preferred embodiment, said carrier is an alcohol such as n-propanol, i-propanol, i-butanol, s-butanol, glycol, 1,2-propylene glycol and glycerol. In a more preferred embodiment, said carrier is a polar aprotic solvent such as N,N'-dimethylformamide, acetonitrile, sulfolane, dimethylsulfoxide, polar glycol ethers such as 1,2-dimethoxyethane, diethylene glycol dimethyl ether or propylene carbonate. Such carriers aid in the stability of the silyl ether groups. In an especially preferred embodiment, said carrier is a polar, polymeric compound, such as polyethylene glycol (PEG) having a molecular weight of between 100 g/mol and 1000 g/mol, and preferably between 200 g/mol and 500 g/mol. More preferably, said polyethylene glycol is an end-capped PEG whereby the terminal groups are i.e. methyl groups, silyl ether groups or other hetero groups without reactive hydrogen atoms. Most preferably, said solvent is water, ethylene glycol, 1,2-propylene glycol and/or glycerol, or mixtures thereof.

In a preferred embodiment, the present invention provides a multi-chamber dispensing device according to the eight aspect of the invention, wherein said silylated polyalcohol has a molecular weight lower than 1500 g/mol, or a stereoisomeric, a pharmaceutically acceptable salt, a solvate or a polymorph thereof, for use in treatment or prevention of infection or infestation by arthropods in a human or animal.

In a preferred embodiment, the present invention provides a multi-chamber dispensing device according to the eight aspect of the invention, wherein said first chamber and/or said second chamber is provided with a dispensing spout, whereby said dispensing spout has at least an open and a closed position.

BRIEF DESCRIPTION OF DRAWINGS

FIG. 2 shows that the silylated polyalcohol 31 is provided in the first chamber 3 and is separated from the second chamber 2 by a seal 32. The spout 4 comprises a conduit 41 having an opening which is closed off by a cap 45. The conduit 41 is provided on the first chamber 3 and has a lever 44 extending into the first chamber. The lever 44 is configured to break the seal 32 upon actuation of the spout. Since lever 44 is moved during actuation, it is important that the volume of the first chamber 3 and the second chamber 2 remain closed off of the environment. To this end, a pliable plastic seal 43 is provided. For ease of actuation, a surface 42 is provided for actuating the lever 44. The seal 32 is configured to be broken upon actuation of cap, as shown in FIG. 3.

Figure 1:
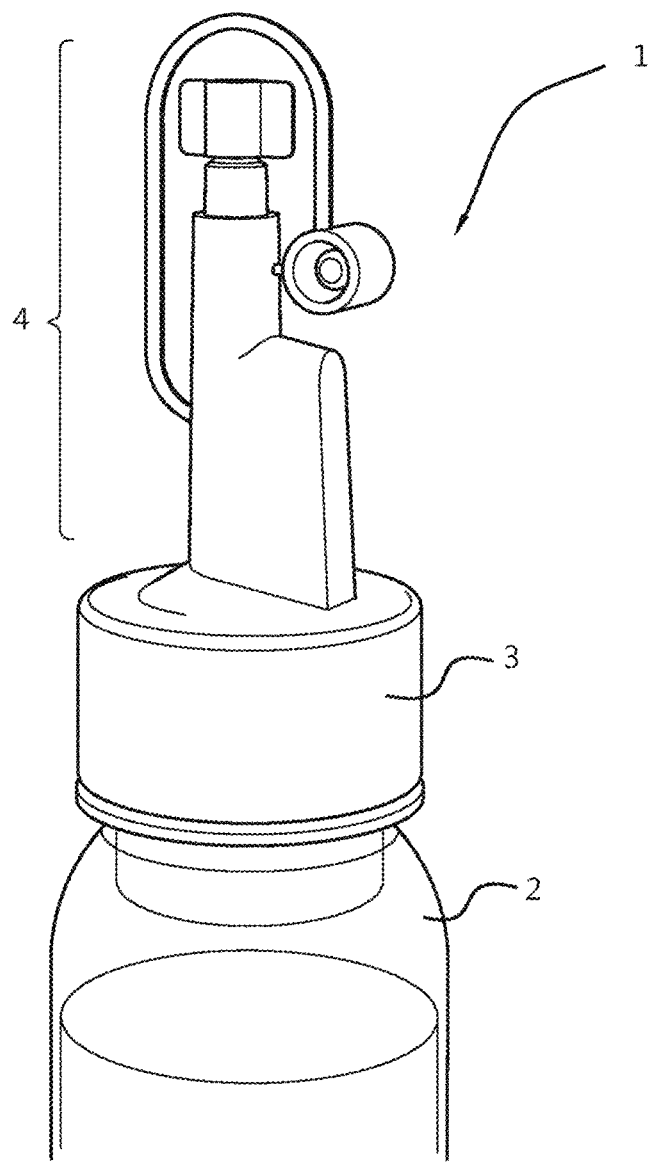
FIG. 1 shows a preferred multi-chamber packaging 1 having a first chamber 3 for storage of the silylated polyol, a second container 2 for providing a solvent and a spout 4. The first chamber 3 and second chamber 2 are engaged by engaging means, to ensure that a closed off internal volume can be formed.
Figure 2:
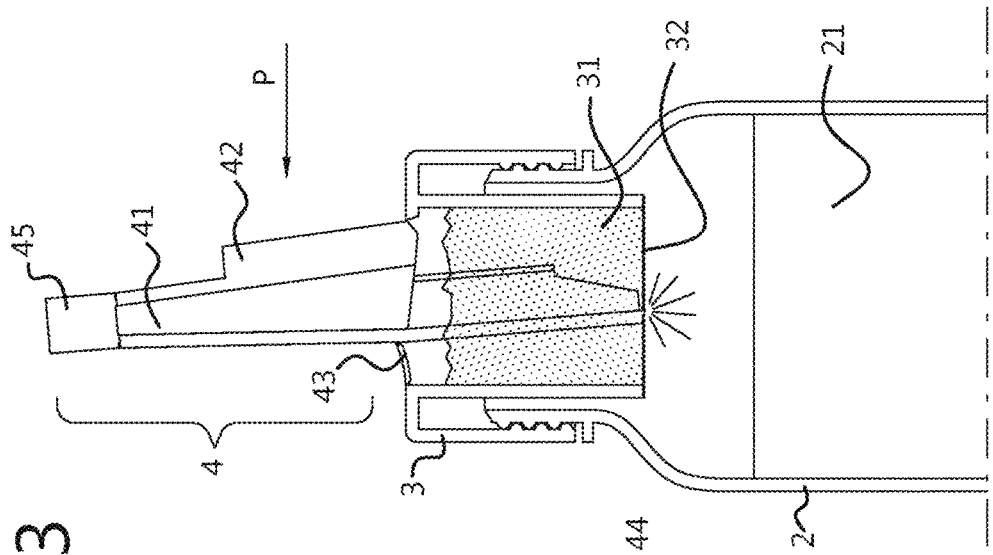
FIG. 2 shows schematically a cross section of the multi-chamber packaging according to FIG. 1, whereby the inner configuration and mechanics are shown.
Figure 3:
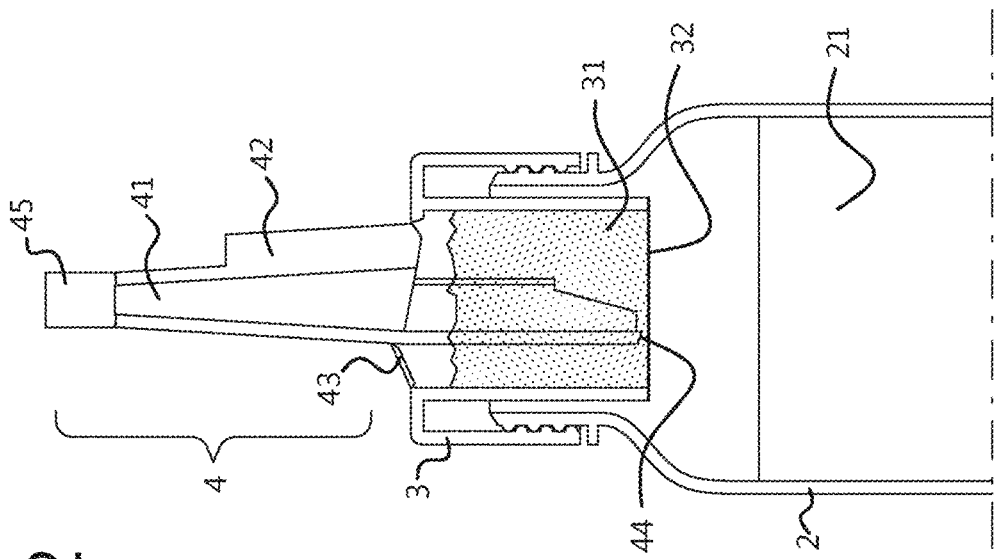
FIG. 3 shows that when the push mechanism P is activated, the spout 4 tilts, thereby tilting the pliable plastic seal 43, and the lever 44 comes into contact with the breakable seal 32.
Figure 4:
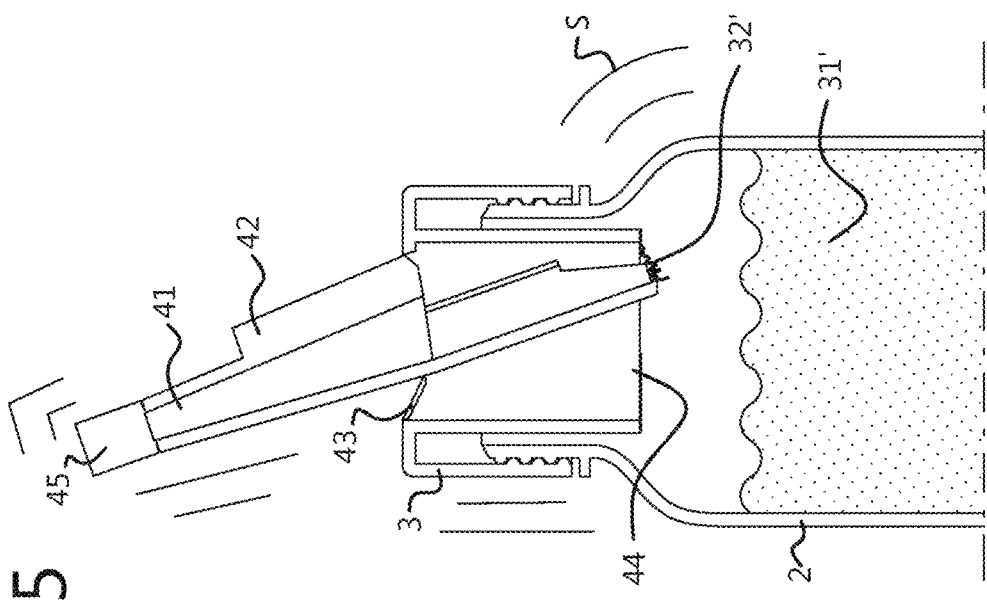

Further actuation, as shown in FIG. 4, results eventually in a broken seal 32' and the silylated polyalcohol 31 is released into the second chamber 2 having a solvent 21, i.e. water.

Figure 5:
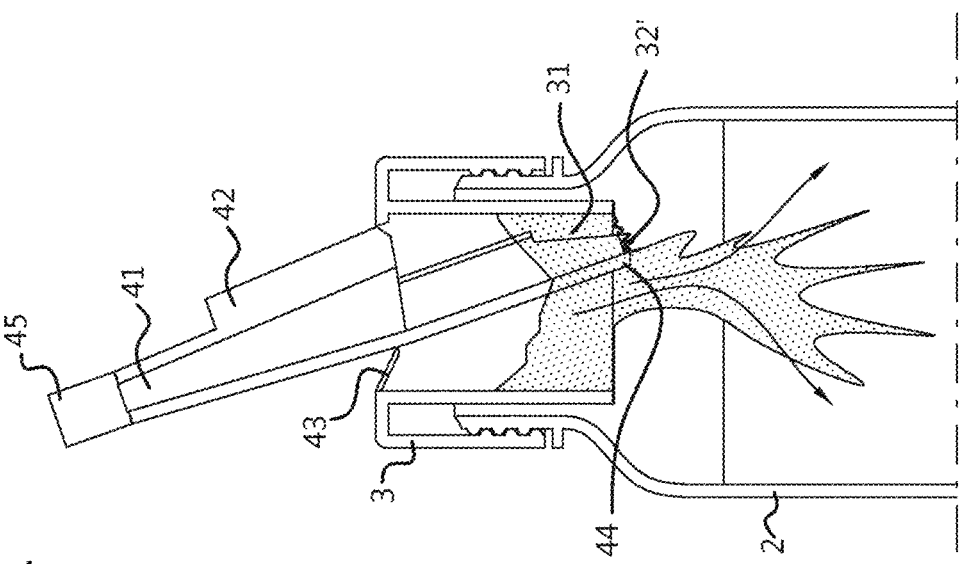

FIG. 5 shows that upon shaking S, the contents of the silylated polyalcohol are homogenized and are fully comprised in the newly formed silylated polyalcohol composition 31'.

FIG. 6 shows that the cap 45 of the spout 4 may be removed by turning T of the cap 45. The silylated polyalcohol composition 31' is now ready to be dosed to a subject in need thereof, such as shown in FIG. 7.

Figure 8:
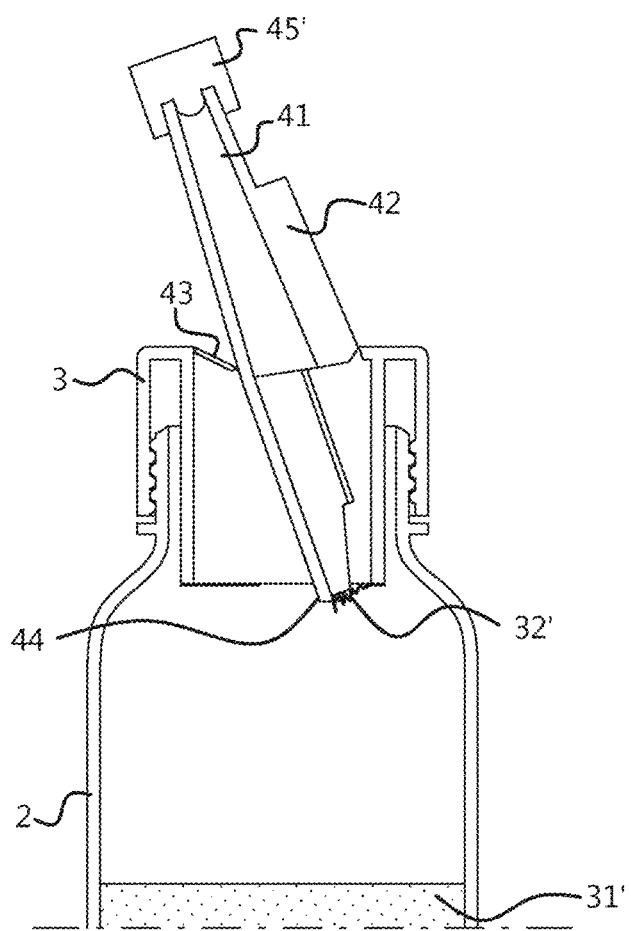

As shown in FIG. 8, the spout 4 can be closed off again with the same 45 or a different cap 45'. As such, the composition 31' may be used over an extended period of time for the treatment of infections or infestations, where multiple treatments are desirable to ensure a successful treatment.

EXAMPLES

In the following examples are intended to further clarify the present invention, and are nowhere intended to limit the scope of the present invention.

Example 1

0.2 mol glycerol and 3.0 equivalents of trimethyl amine are diluted in 100 mL dry ethyl acetate. 3.0 equivalents of trimethylsilyl chloride is added dropwise under vigorously stirring at room temperature over a period of 10 minutes. Subsequently, the mixture is heated to 80° C. for 2 hours.

After 2 hours, the reaction mixture is allowed to cool down to room temperature and 100 mL of petroleum ether is added. The colourless precipitate is filtered off and the organic phase is washed twice with 100 mL of water. Finally, the organic phase is dried on magnesium sulphate and the solvent is removed in vacuo. High purity (>90%) is confirmed by GC-FID, GC-MS and IR spectroscopy. Table 1 shows that the silylated polyalcohol 1 has a log P value of 3.909, indicating its predominant hydrophobic character.

Examples 2-17

Other silylated polyalcohols 2-9 were prepared from the polyalcohols 2-9 in Table 1 below. Table 1 provides an overview of silylated polyalcohol compounds according to the invention.

TABLE 1

Silylated polyalcohols with solubility properties.

| Example | polyalcohol | silylated polyalcohol | logP * |
|---|---|---|---|
| 1 | glycerol (HOCH₂-CHOH-CH₂OH) | tris(trimethylsilyloxy)propane | 3.909 |
| 2** | propylene glycol | 1,2-bis(trimethylsilyloxy)propane | 3.078 |
| 3** | pentaerythritol | tetrakis(trimethylsilyloxy)neopentane | 5.379 |
| 4 | 1,2-dodecanediol | 1,2-bis(trimethylsilyloxy)-dodecane | n.d. |
| 5** | hexitol (sorbitol-type) | hexakis(trimethylsilyloxy) derivative | 7.570 |
| 6** | glucose (pyranose) | pentakis(trimethylsilyloxy)-glucopyranose | 6.075 |
| 7** | mannitol | hexakis(trimethylsilyloxy)-mannitol | 7.570 |
| 8** | 1,2-octanediol | 1,2-bis(trimethylsilyloxy)octane | 5.028 |

TABLE 1-continued

Silylated polyalcohols with solubility properties.

| Example | polyalcohol | silylated polyalcohol | logP * |
|---------|-------------|----------------------|--------|
| 9** | | | 7.510 |
| 10 | | | 3.125 |
| 11 | | | 0.989 |
| 12 | | | 3.330 |

TABLE 1-continued

Silylated polyalcohols with solubility properties.

| Example | polyalcohol | silylated polyalcohol | logP * |
|---|---|---|---|
| 13 | | 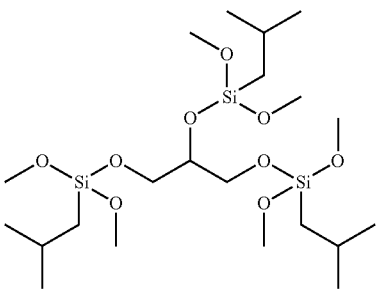 [SMILES: CO[Si](CC(C)C)(OC)OCC(CO[Si](CC(C)C)(OC)OC)O[Si](CC(C)C)(OC)OC] | 4.068 |
| 14 | | 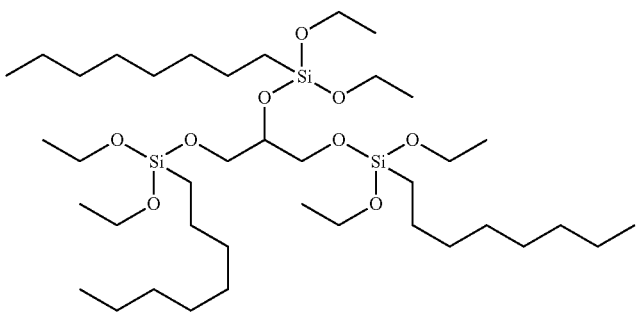 [SMILES: CCCCCCCC[Si](OCC)(OCC)OCC(CO[Si](CCCCCCCC)(OCC)OCC)O[Si](CCCCCCCC)(OCC)OCC] | 11.522 |

* AlogP98 value of silylated polyalcohol calculated using QSAR methods, Hansch, C., Leo, A., D. Hoekman. Exploring QSAR - Hydrophobic, Electronic, and Steric Constants. Washington, DC: American Chemical Society, 1995, p. 7.
**TMS trimethyl silyl.
n.d. not determined.

Examples 15-27

Silylated polyalcohol 1 is added to glycerol in an amount of 4.0 wt. %, relative to the total weight of the composition, and homogenized.

TABLE 2

Compositions comprising a silylated polyalcohol in a suitable carrier.

| EXAMPLE | Composition |
|---|---|
| 15 | 4.0 wt. % of silylated polyalcohol 1 in glycerol |
| 16 | 4.0 wt. % of silylated polyalcohol 2 in glycerol |
| 17 | 4.0 wt. % of silylated polyalcohol 3 in glycerol |
| 18 | 4.0 wt. % of silylated polyalcohol 4 in glycerol |
| 19 | 4.0 wt. % of silylated polyalcohol 5 in glycerol |
| 20 | 4.0 wt. % of silylated polyalcohol 6 in glycerol |
| 21 | 4.0 wt. % of silylated polyalcohol 1 in mineral oil |
| 22 | 4.0 wt. % of silylated polyalcohol 2 in mineral oil |
| 23 | composition obtained by heating 4.0 wt. % of silylated polyalcohol 2 in glycerol at a temperature of 40° C. for 2 months |
| 24 | composition obtained by heating 4.0 wt. % of silylated polyalcohol 2 in propylene glycol at a temperature of 40° C. for 2 months |

TABLE 3

Ovicidal and adulticidal compositions without a silylated polyalcohol.

| EXAMPLE | Composition |
|---|---|
| 25 | glycerol |
| 26 | 4.0 wt. % of dimethicone in glycerol |
| 27 | mineral oil |
| 28 | 4.0 wt. % of dimethicone in mineral oil |
| 29 | 50.0 wt. % of dimethicone in mineral oil |

TABLE 4

Ovicidal and adulticidal activity of compositions comprising silylated polyalcohols in comparison to state of the art.

| EXAMPLE | ovicidal activity $^a$ | adulticidal activity $^a$ |
|---|---|---|
| 15 | 83 | 95 |
| 16 | n.d. | 94 |
| 17 | n.d. | 100 |
| 18 | n.d. | 100 |
| 19 | n.d. | 56 |
| 20 | n.d. | 60 |
| 21 | 70 | n.d. |
| 22 | n.d. | 35 |
| 23 | n.d. | 28 |
| 24 | n.d. | 28 |
| 25 | 33 | 4 |
| 26 | n.d. | 16 |
| 27 | 89 | 35 |
| 28 | 71 | 100 |
| 29 | 100 | 100 | n.d. not determined.
$^a$ ovicidal and adulticidal activity was determined by determining the mortality rate of lice and eggs 120 minutes after treatment, the treatment consisting of a 1 minute submersion of lice or eggs in the composition followed by a 4 minute exposure period, at a temperature of about 32° C.

Table 4 details the activity of compositions according to Examples 15-20, each comprising a silylated polyalcohol in a glycerol carrier. The results show that a very high ovicidal and adulticidal activity is obtained. When compared to dimethicone in the same carrier (see example 26 in Table 4)—a representative example of the state of the art—the silylated polyalcohols exhibit a markedly higher activity. When a more hydrophobic carrier is selected (i.e. mineral oil, see examples 21-22 in Table 4), the activity of the silylated polyalcohols diminishes strongly. However, the obtained results show that even in a hydrophobic carrier, such compositions outperform compositions comprising silicon based compounds according to the state of the art in terms of ovicidal or adulticidal activity.

Satisfying results were also obtained for the composition comprising monosilylated polyalcohols obtained by heating 4.0 wt. % of silylated polyalcohol 2 in glycerol at a temperature of 40° C. for 2 months, see example 23. Analysis showed that the composition comprised 1-trimethylsiloxy-2-propanol and 1-trimethylsiloxy-glycerol in about equal amounts. Similarly, heating a composition comprising 4.0 wt. % of silylated polyalcohol 2 in propylene glycol at a temperature of 40° C. for 2 months yielded a composition comprising predominantly 1-trimethylsiloxy-2-propanol as silylated polyalcohol, see example 24. The compositions according to examples 26 and 24 showed an adulticidal activity that is higher than the negative control example 25 and a representative example according to the state of the art, example 26. These results show that silylated polyalcohols comprising merely one silylated alcohol group also exhibit arthropod treatment activity.

These results indicate that the preferred embodiment of the invention provides a composition comprising a hydrophobic silylated polyalcohol having a positive log P value; which silylated polyalcohol has three to four silylated alcohol groups and a molecular weight below about 500 g/mol; which silylated polyalcohol is provided in a hydrophilic carrier having a negative log P value.

Example 30

A 2.0 wt. % of silylated polyalcohol 1 in glycerol was evaluated for its adulticidal activity towards lice. Adulticidal activity was determined by determining the mortality rate of lice and eggs 120 minutes after treatment, the treatment consisting of a 1 minute submersion of lice or eggs in the composition followed by a 14 minute exposure period, at a temperature of about 32° C. Nits were evaluated over a period of 10 to 12 days. The lice were treated effectively in terms of reduction in number and proved complete after multiple treatments.

Example 31

A 4.0 wt. % of silylated polyalcohol 1 in propylene glycol was evaluated for its adulticidal activity towards lice. Adulticidal activity was determined by determining the mortality rate of lice and eggs 120 minutes after treatment, the treatment consisting of a 1 minute submersion of lice or eggs in the composition followed by a 14 minute exposure period, at a temperature of about 32° C. Nits were evaluated over a period of 10 to 12 days. The lice were treated effectively in terms of reduction in number and proved complete after multiple treatments.

Example 32

A 4.0 wt. % of silylated polyalcohol 3 in glycerol was evaluated for its adulticidal activity towards fleas. Adulticidal activity was determined by determining the mortality rate of fleas and eggs 120 minutes after treatment, the treatment consisting of a 1 minute submersion of fleas or eggs in the composition followed by a 14 minute exposure period, at a temperature of about 32° C. Nits were evaluated over a period of 10 to 12 days. The fleas were treated effectively in terms of reduction in number and proved complete after multiple treatments.

Example 33

A 4.0 wt. % of silylated polyalcohol 3 in glycerol was evaluated for its adulticidal activity towards bed bugs. Adulticidal activity was determined by determining the mortality rate of lice and eggs 120 minutes after treatment, the treatment consisting of a 1 minute submersion of bed bugs or eggs in the composition followed by a 14 minute exposure period, at a temperature of about 32° C. The bed bugs were treated effectively in terms of reduction in number and proved complete after multiple treatments.

Example 34

A 4.0 wt. % of silylated polyalcohol 4 in glycerol was evaluated for its adulticidal activity towards ticks. Adulticidal activity was determined by determining the mortality rate of ticks and eggs 120 minutes after treatment, the treatment consisting of a 1 minute submersion of ticks or eggs in the composition followed by a 14 minute exposure period, at a temperature of about 32° C. The ticks were treated effectively in terms of reduction in number and proved complete after multiple treatments.

Example 35

A 4.0 wt. % of silylated polyalcohol 6 in glycerol was evaluated for its adulticidal activity towards ticks. Adulticidal activity was determined by determining the mortality rate of ticks and eggs 120 minutes after treatment, the treatment consisting of a 1 minute submersion of ticks or eggs in the composition followed by a 14 minute exposure period, at a temperature of about 32° C. The ticks were treated effectively in terms of reduction in number and proved complete after multiple treatments.

Example 36

A 4.0 wt. % of silylated polyalcohol 4 in glycerol was evaluated for its adulticidal activity towards mites. Adulticidal activity was determined by determining the mortality rate of mites and eggs 120 minutes after treatment, the treatment consisting of a 1 minute submersion of mites or eggs in the composition followed by a 14 minute exposure period, at a temperature of about 32° C. The mites were treated effectively in terms of reduction in number and proved complete after multiple treatments.

Example 37

A 4.0 wt. % of silylated polyalcohol 7 in glycerol was evaluated for its adulticidal activity towards lice. Adulticidal activity was determined by determining the mortality rate of lice and eggs 120 minutes after treatment, the treatment consisting of a 1 minute submersion of lice or eggs in the composition followed by a 14 minute exposure period, at a temperature of about 32° C. The lice were treated effectively in terms of reduction in number and proved complete after multiple treatments.

Example 38

A 4.0 wt. % of silylated polyalcohol 10 in glycerol was evaluated for its adulticidal activity towards lice. Adulticidal activity was determined by determining the mortality rate of lice and eggs 120 minutes after treatment, the treatment consisting of a 1 minute submersion of lice or eggs in the composition followed by a 14 minute exposure period, at a temperature of about 32° C. The lice were treated effectively in terms of reduction in number and proved complete after multiple treatments.

Example 39

A 4.0 wt. % of silylated polyalcohol 1 in glycerol was topically applied to the hair of a human subject, to the pelt of an animal subject and to the feathers of birds, respectively. The composition was contacted with the hairs or feathers intensely for a period of 15 minute. Next, the composition was washed out using an excess of water. It was experienced that the composition was easily removed from the hairs or feathers after topical application, in contrast to silicone compositions, i.e. dimethicone compositions, according to the state of the art. The ease of removal of the composition after treatment allows for better removal of any lice, fleas, bugs, ticks or mites from the treated human or animal, respectively, which lice, fleas, bugs, ticks or mites may otherwise recover from the treatment and proceed the infestation.

Example 40

5.25 wt. % of silylated polyalcohol 1, 25 wt. % glycerine, 1.50 wt. % phenoxyethanol, 0.50 wt. % xanthan gum, 1.50 wt. % 0 perfume in water was evaluated for its adulticidal activity towards lice. Adulticidal activity was determined by determining the mortality rate of lice and eggs 120 minutes after treatment, the treatment consisting of a 15 minute exposure of lice or eggs in the composition, at a temperature of about 32° C. Nits were evaluated over a period of 10 to 12 days. The lice were treated effectively in one treatment in terms of complete mortality.

What is claimed is:

1. A method for treatment of infection or infestation by lice and/or their eggs in a human comprising administrating an effective amount of a silylated polyalcohol, or a stereo-isomeric, a pharmaceutically acceptable salt, a solvate or a polymorph thereof, wherein said silylated polyalcohol comprises a central organic hydrocarbon scaffold of 2 to 12 carbon atoms, wherein the central organic hydrocarbon is a linear or branched alkane.

2. The method of claim 1, wherein the said silylated polyalcohol is selected from the group consisting of:

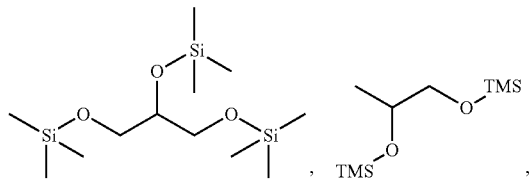

-continued

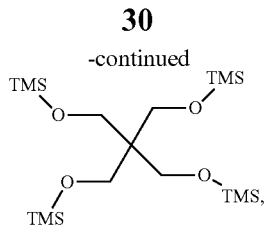

1,2-bis(trimethylsiloxy)-dodecane, and

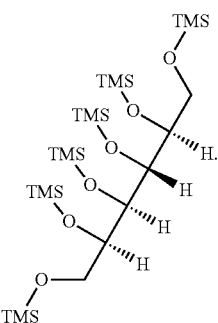

3. The method of claim 2, wherein said silylated polyalcohol is

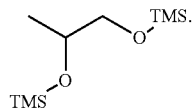

4. The method of claim 1, wherein said silylated polyalcohol is in a composition comprising a pharmaceutically or cosmetically acceptable carrier, wherein said carrier is hydrophilic, as determined by an AlogP98 value lower than 0.000.

5. The method of claim 4, wherein said carrier is water or glycerol.

6. The method of claim 1, wherein the silylated polyalcohol has a molecular weight lower than 10,000 g/mol.

7. The method of claim 6, wherein the silylated polyalcohol has a molecular weight lower than 5000 g/mol.

8. The method of claim 1, wherein the silylated polyalcohol has a molecular weight of between 100 g/mol and 1500 g/mol.

9. The method of claim 1, wherein the silylated polyalcohol has at least one alcohol group that is silylated.

10. The method of claim 1, wherein the silylated polyalcohol has three, four or five alcohol groups that are silylated.

11. The method of claim 1, wherein the silylated polyalcohol has at least 50% of all alcohol groups that are silylated.

12. The method of claim 1, wherein the silylated polyalcohol comprises a main chain having multiple silyl ether side and/or end groups.

13. The method of claim 1, wherein the silylated polyalcohol has three or more alcohol groups that are silylated.

14. The method of claim 1, wherein the silylated polyalcohol has three to six alcohol groups that are silylated.

15. The method of claim 1, wherein the silylated polyalcohol has three or four alcohol groups that are silylated.

16. The method of claim 1, wherein the silylated poyalcohol has a positive log P value.

17. The method of claim 1, wherein the silylated polyalcohol has a molecular weight below about 500 g/mol.

18. The method of claim 1, wherein the silylated polyalcohol is administered in a composition comprising the silylated polyalcohol and a hydrophilic carrier having a negative log P value.

19. The method according to claim 1, wherein all alcohol groups are silylated.

20. The method according to claim 1, wherein said silylated polyalcohol comprises a central organic hydrocarbon scaffold of 2 to 6 carbon atoms.

21. The method according to claim 1, wherein the silylated polyalcohol comprises silyl ether functional groups O—$SiR_1R_2R_3$, wherein $R_1$, $R_2$ and $R_3$ are independently selected from the group consisting of H and alkyl.

22. The method according to claim 1, wherein the silylated polyalcohol comprises silyl ether functional groups O—$SiR_1R_2R_3$, wherein $R_1$, $R_2$ and $R_3$ are independently selected from the group consisting of H and C1-C8 alkyl.

23. The method according to claim 1, wherein the silylated polyalcohol comprises silyl ether functional groups O—$SiR_1R_2R_3$, wherein $R_1$, $R_2$ and $R_3$ are independently C1-C4 alkyl.

\* \* \* \* \*